(12) United States Patent
Moussavi et al.

(10) Patent No.: US 12,528,379 B2
(45) Date of Patent: *Jan. 20, 2026

(54) SYSTEM AND METHOD FOR CHARGING MOTOR VEHICLES

(71) Applicants: CHARGEPOLY, Gautier de la Lauziere (FR); INSTITUT VEDECOM, Versailles (FR)

(72) Inventors: Hadi Moussavi, Aix-en-Provence (FR); Paul Coyne, Paris (FR); Joe Matta, Saint-Cyr-l'École (FR); Christophe Ripoll, Chevreuse (FR)

(73) Assignees: CHARGEPOLY, Gautier de la Lauziere (FR); INSTITUT VEDECOM, Versailles (FR)

( * ) Notice: Subject to any disclaimer, the term of this patent is extended or adjusted under 35 U.S.C. 154(b) by 639 days.

This patent is subject to a terminal disclaimer.

(21) Appl. No.: 17/995,843

(22) PCT Filed: Apr. 15, 2021

(86) PCT No.: PCT/EP2021/059737
§ 371 (c)(1),
(2) Date: Oct. 7, 2022

(87) PCT Pub. No.: WO2021/209532
PCT Pub. Date: Oct. 21, 2021

(65) Prior Publication Data
US 2023/0150390 A1 May 18, 2023

(30) Foreign Application Priority Data

Apr. 16, 2020 (FR) .................................. FR2003816
May 15, 2020 (FR) .................................. FR2004881

(51) Int. Cl.
*H02J 7/00* (2006.01)
*B60L 53/10* (2019.01)
(Continued)

(52) U.S. Cl.
CPC ................ *B60L 53/67* (2019.02); *B60L 53/11* (2019.02); *B60L 53/14* (2019.02); *B60L 53/66* (2019.02); *B60L 58/12* (2019.02); *H02J 7/0013* (2013.01)

(58) Field of Classification Search
CPC .......... B60L 53/11; B60L 53/67; B60L 53/14; B60L 53/66; B60L 58/12; H02J 7/0013
(Continued)

(56) References Cited

U.S. PATENT DOCUMENTS 9,555,715 B2 * 1/2017 Sugano .................... B60L 53/30
9,592,742 B1 * 3/2017 Sosinov .................. B60L 53/68
(Continued)

FOREIGN PATENT DOCUMENTS

EP 3346571 A1 7/2018
FR 3095992 A1 11/2020
(Continued)

*Primary Examiner* — Alexis B Pacheco (57) ABSTRACT

The charging system comprises: two chargers (2a, 2b) which deliver instantaneous electrical energy for charging an electric vehicle, with different electrical charging characteristics, two electrical lines (16a, 16b), each connecting one of the two chargers (2a, 2b) to a plurality of charging points (4), each serving a charging space (5), a switching system (6) which is associated with each charging point (4) and which connects or does not connect an electric vehicle to the first or the second charger (2), such that each charger (2a, 2b) is connected at most to one charging point (4), and a control system (8) which controls the switching system (6).

12 Claims, 5 Drawing Sheets

(51) Int. Cl.
*B60L 53/14* (2019.01)
*B60L 53/66* (2019.01)
*B60L 53/67* (2019.01)
*B60L 58/12* (2019.01)
*H02J 7/14* (2006.01)

(58) Field of Classification Search
USPC .......................................................... 320/109
See application file for complete search history.

(56) References Cited

U.S. PATENT DOCUMENTS

| | | | | |
|---|---|---|---|---|
| 10,093,193 | B2* | 10/2018 | Ohkuma | B60L 53/305 |
| 2011/0015814 | A1* | 1/2011 | Starr | G07F 15/003 |
| | | | | 320/101 |
| 2011/0106329 | A1* | 5/2011 | Donnelly | B60L 53/665 |
| | | | | 320/109 |
| 2011/0291616 | A1 | 12/2011 | Kim et al. | |
| 2012/0200256 | A1* | 8/2012 | Tse | B60L 53/14 |
| | | | | 320/109 |
| 2013/0057209 | A1* | 3/2013 | Nergaard | B60L 1/003 |
| | | | | 320/109 |
| 2013/0069592 | A1* | 3/2013 | Bouman | B60L 53/56 |
| | | | | 320/109 |
| 2013/0179061 | A1* | 7/2013 | Gadh | B60L 53/305 |
| | | | | 701/1 |
| 2014/0253034 | A1* | 9/2014 | Kurimoto | B60L 53/30 |
| | | | | 320/109 |
| 2018/0254643 | A1 | 9/2018 | Paluszek et al. | |
| 2019/0070970 | A1 | 3/2019 | Chan et al. | |
| 2020/0139827 | A1* | 5/2020 | Koolen | B60L 53/63 |
| 2021/0101500 | A1* | 4/2021 | Brombach | B60L 53/67 |
| 2022/0227243 | A1* | 7/2022 | Moussavi | H02J 1/106 |

FOREIGN PATENT DOCUMENTS

| | | |
|---|---|---|
| JP | 2015186391 A | 10/2015 |
| WO | WO2018140886 A1 | 8/2018 |
| WO | WO2018192951 A1 | 10/2018 |

* cited by examiner

SYSTEM AND METHOD FOR CHARGING MOTOR VEHICLES

FIELD OF THE INVENTION

The present invention relates to systems and methods for charging electrical devices, particularly electrically chargeable motor vehicles.

TECHNOLOGICAL BACKGROUND

More specifically, the invention relates to a motor vehicle charging system.

For a hundred years, motor vehicles have essentially been powered by energy from fossil sources. For decades, distributing energy to motor vehicles has implemented stations, at which the fuel tank of the vehicle is filled in a few seconds. These stations allow flexibility, offering different types of fuels from fossil sources. In addition, motor vehicles being intended to move, the result is a fine territorial network of stations.

In recent years, more and more motor vehicles need to be charged with a complementary or alternative source of energy, such as electricity in the case of hybrid fossil fuel/electric vehicles, or all-electric vehicles. The autonomy of a vehicle equipped with an on-board alternative energy tank is generally lower. In addition, the charging time of such a tank is longer than for fossil energy. In addition, there are many new energy systems, so it becomes complicated to have all the services at the station. In addition, there are still few vehicles powered by alternative energies, which does not justify each station equipping itself with numerous alternative energy charging systems. This results in a paradigm shift in the motor vehicle energy charging system. This paradigm shift has led to the relocation of the charging service from traditional stations to parking places. Today, energy charging is possible in many reserved locations arranged in the immediate vicinity of an energy source.

However, this solution is not optimal because, if there are not enough of them, the reserved equipment is all occupied, which prevents the charging of a motor vehicle. And, if there are enough of them, they are often unoccupied, but forbidden, which is problematic with respect to traditional vehicles. This solution is therefore not flexible enough to meet the mobility needs of users and the rapid increase in the number of vehicles using alternative energy sources.

US 2018/254,643 describes a system for timing the charging of electric vehicles. However, this system remains greedy in terms of infrastructure.

Document FR 3 095 992 was not public on the priority date of this patent application. This document describes a system and a method for charging electric vehicles comprising an electric chain connecting two electric chargers, with a plurality of charging slots arranged between the two electric chargers along the electric chain.

Document WO 2018/192.951 describes an electric vehicle charging system comprising three chargers and four electric vehicles interfaced together by a switching matrix. Regarding the chargers, it is indicated that they can implement a charge at an output voltage of 200-500V at 125 A (Combo-1) or 50-500 V at 120 A (Chademo) and/or can meet the connection standards EN61851-23/DIN 70121 Combo-1 and/or Chademo 1.0 DC for output ports. This system includes short-circuit sensors adapted to detect short-circuits which would occur in the event that several vehicles were plugged into an unsuitable circuit configuration. In this case, if a short circuit is detected, some contacts are opened to get rid of the short circuit.

JP 2015/186,391 describes several embodiments. In the embodiment of FIG. 1, the electric vehicle charging system includes a power source, a converter controlled by a controller to power electric vehicles. This first embodiment provides that it is possible to switch the switches in order to electrically charge a vehicle both by the energy source and by another vehicle. FIG. 6 depicts an electric vehicle charging system comprising a power source, multiple converters controlled by controllers to power electric vehicles. The system also includes a downstream switching block. In this embodiment, a new vehicle arriving at any charging station will be assigned the charger with the largest electrical power "margin". For example, a vehicle, although apparently connected in front of a charger, can be connected to another charger through the switch block. In line with the first embodiment, it is indicated that, in this case, the other vehicles are also used to load this vehicle. Depending on the configuration presented, it then seems impossible to simultaneously charge other vehicles. The embodiment of FIG. 7 is similar to the previous one, except that the switching block is moved upstream of the load control device.

Document US 2014/253,034 describes an electric vehicle charging system comprising a so-called "fast" charger and a so-called "normal" charger. As can be seen in FIG. 1, a switch box makes it possible to connect any charging terminal with the fast charger. Another switch box allows any charging station to be connected with the normal charger. A charging plan is determined to charge a newly arriving vehicle first with the fast charger, then with the normal charger. According to the embodiment of FIG. 7, the planning unit is integrated into a vehicle.

Document EP 3346571 describes a system in which a switching matrix is interposed between a plurality of DC modules and outputs which correspond to parking spaces. The problem that this document aims to solve is that, in the event of maintenance, the position of the modules is modified. The proposed solution is to integrate this switching matrix, which makes it possible to "direct" the distributed energy to the right location.

The invention thus aims to improve the availability of electrical energy charging systems for motor vehicles, and to better adjust the installed charging capacity of the charging infrastructure.

SUMMARY OF THE INVENTION

Thus, the invention relates to a system for charging electric vehicles with electrical energy comprising:
  at least a first charger and a second charger, each charger being adapted to supply instantaneous electrical energy for charging an electric vehicle, said electrical energies having different electrical charging characteristics,
  a first electric line adapted to connect the first charger to an electric vehicle located at any location;
  a second electric line) adapted to connect the second charger to an electric vehicle located at any location,
  a switching system adapted to alternatively connect or not connect the electric vehicles to the first charger or to the second charger, wherein the switching system comprises a switching device associated respectively with each location (5) for charging an electrical device,
each device switch being able to alternatively:
  electrically connect the location associated with the switching device to the first charger, electrically connect the location associated with the switching device to the second charger,
electrically disconnect the location from any charger and from any other charging location;
a computerized reception module of a control system suitable for receiving electrical charge demand information from electric vehicles,
a processor of a control system adapted to repeatedly determine a map of connections between the electric vehicles and the chargers, as a function at least of the received electrical charge information and of said electrical charging characteristics, the control system being adapted to repeatedly control the switching system to electrically connect one of the electric vehicles to the first charger and another of the electric vehicles to the second charger.

Thanks to these arrangements, many electric vehicles can be charged over a given period of time using fewer chargers. Parking spaces may not be reserved for electric vehicles only.

Depending on various aspects, it is possible to provide one and/or the other of the provisions below.

According to one embodiment, the processor is suitable for determining the map of connections from one and/or more electrical charge demand information chosen from:
information on the arrival time of an electric vehicle at the charging system;
information on the estimated departure time of an electric vehicle from the charging system;
information on the estimated duration of presence of an electric vehicle in the charging system;
information on the initial charge level of an electric vehicle;
Information on the desired final charge level for an electric vehicle;
information on the instantaneous charge level of an electric vehicle;
a set of physical parameters of the state of an electric vehicle such as the temperature of the battery, its electrical voltage.

According to one embodiment, the processor is adapted to determine the map of connections also from information chosen from:
instantaneous time information provided by a clock;
information on the availability of the energy source such as the electrical grid.

According to one embodiment, the electrical charging characteristics of the chargers comprise an instantaneous direct current electrical charging power.

According to one embodiment, the processor is adapted to determine the map of connections by minimizing a difference between the nominal charging power available at the charging system and the charging power consumed, taking into account, in terms of constraints, the configuration of the charging system, the current map of connections and an estimate of the future charging demand.

[empty]
[empty]
[empty]
[empty]

According to one embodiment, at least one of the chargers is movable, the control system being adapted to repeatedly control the switching system to electrically connect one of the electrical devices to the first charger and another of the electrical devices to the second charger depending on the location of the chargers.

According to one embodiment, the mobile charger connects to an electrical line at a location.

According to one embodiment, the mobile charger is an electric vehicle.

According to one embodiment, the switching system is configured so that each charger is connected, at any given instant, to at most one charging terminal.

According to one embodiment, the control system is external to any vehicle to be charged.

According to another aspect, the invention relates to a method for charging electrical devices with electrical energy wherein, having:
at least a first charger and a second charger, each charger being adapted to supply instantaneous electrical energy for charging an electric vehicle, said electrical energy having different electrical charging characteristics;
a first electric line adapted to connect the first charger to an electric vehicle located at any location;
a second electric line suitable for connecting the second charger to an electric vehicle located at any location,
a switching system adapted to alternately connect or not connect the electric vehicles to the first charger or to the second charger, the switching system comprising a switching device respectively associated with each location for charging an electrical device, each switching device being adapted to alternately:
electrically connect the location associated with the switching device to the first charger,
electrically connect the location associated with the switching device to the second charger,
electrically disconnect the location from any charger and from any other charging location;
a computerized reception module of a control system receives electrical charge demand information from electric vehicles;
a processor of the control system repeatedly determines a map of connections between the electric vehicles and the chargers as a function at least of the received electric charge demand information and of the said electric charge characteristics,
the control system repeatedly controls the switching system to electrically connect one of the electric vehicles to the first charger and another of the electric devices to the second charger.

According to another aspect, the invention relates to a computer program comprising instructions which, when the program is executed by a computer, lead the latter to implement this method.

BRIEF DESCRIPTION OF THE DRAWINGS

Embodiments of the invention will be described below with reference to the drawings, briefly described below.

DETAILED DESCRIPTION

Figure 1:
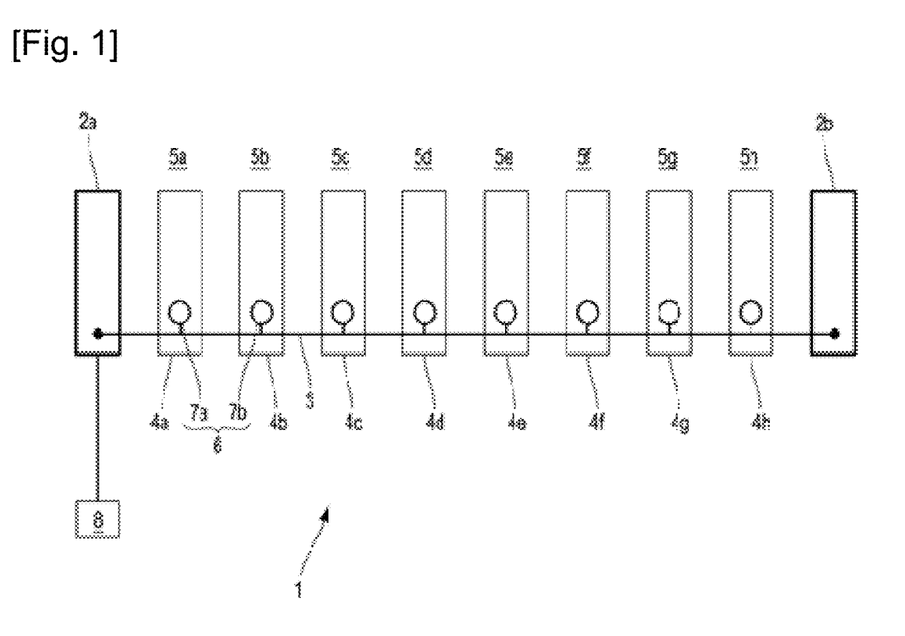
FIG. 1 schematically represents a charging system according to one embodiment.

FIG. 1 schematically represents a charging system 1 according to one embodiment. The charging system 1 includes a first charger 2a and a second charger 2b. Here, the chargers can be designated either by the general reference "2", or individually by the reference "2" followed by a letter. Each charger 2 is connected to an energy source, and is capable, instantaneously, of supplying electrical energy to an electric vehicle, according to a particular charging mode. In the present example, for simplicity, the electric charger 2a implements a single particular charging mode, namely, for example, a so-called "faster" charge according to the standards published and in force on the priority date of this patent application. This is for example a direct current load, with a power equal to or greater than 50 kW, or even 100 kW, or even 200 kW, or even 350 kW. The electric charger 2b implements a single particular charging mode, namely, for example, a so-called "slower" charge according to the standards published and in force on the priority date of the present patent application. This is for example a direct current charge, with a power lower than the power of the electric charger 2a, for example at most equal to 50 kW. Thus, the electric chargers 2a and 2b have different electric charging characteristics, and in particular a different direct current power. The direct current power difference between the two chargers is at least equal to 5 kW, or even 10 kW, if necessary at least equal to 30 kW, or even at least equal to 50 kW. According to a variant embodiment, the electric chargers 2a and 2b have a different voltage. For example, a first charger 2a is provided at a voltage equal to 800 V, and a second charger 2b at a voltage equal to 400 V. According to the examples, a voltage difference at least equal to 100 V is provided between the two chargers. According to a variant embodiment, the electric chargers 2a and 2b have a different intensity. For example, a first charger 2a is provided at an intensity equal to 50 A, and a second charger 2b at an intensity equal to 63 A. According to the examples, an intensity difference at least equal to 10 A is provided, in particular at least equal to 30 A, or even least equal to 50 A, between the two chargers. More generally, the electrical characteristic considered may be the set of admissible operating points in terms of electrical voltage and electrical current (so-called "Safe Operating Area"), which can be produced by the charger. By "different", it is understood here that the difference in electrical characteristics of the two chargers goes beyond the intrinsic dispersion between electrical chargers designed to be identical. Two chargers, for example, have different characteristics if a given operating point is admissible for one but not for another. The energy source from which the energy supplied by the charger 2 comes is for example one and/or the other of the electrical network, of a renewable energy source, of energy storage (battery, fuel cell with hydrogen storage, etc.).

In this example, the two chargers 2a, 2b are distant from each other.

The charging system 1 comprises an electric chain 3 extending from one of the two chargers to the other. The electric chain 3 is able to transport the electric energy coming from each charger 2 intended for electric vehicles (not shown) arranged in electric locations 5a-5h arranged along the electric chain 3 between the two chargers.

The charging system 1 further comprises a plurality of charging terminals. Here, the charging terminals can be designated either by the general reference "4", or individually by the reference "4" followed by a letter. In this embodiment, the number of charging terminals 4 is greater than or equal to the number of chargers 2. The various charging terminals 4 are interposed between the chargers. More specifically, the arrangement in the embodiment of FIG. 1 is as follows, from left to right: charger 2a, then charging terminal 4a, then charging terminal 4b, then charging terminal 4c, and so on, until the charging terminal 4h, and finally the charger 2b.

The chargers 2 and the charging terminals 4 are arranged along the electric chain 3. Thus, by "interposed between" two devices, it is meant that the charging terminal is between two other devices along the electric chain 3.

Each charging terminal 4 serves an electric vehicle charging location. Here, the charging locations can be designated either by the general reference "5", or individually by the reference "5" followed by a letter. The letter designating the charging location is the same as the letter designating the charging terminal associated with the charging location.

Each charging location 5 is capable of receiving an electric vehicle capable of being charged with electrical energy by the charging system 1 via the associated charging terminal 4.

The charging system includes a switching system 6. The switching system 6 comprises a set of switching devices. The switching devices can be designated either by the general reference "7", or individually by the reference "7" followed by a letter. A switching device 7 is associated with each charging terminal 4. The letter designating the switching device is the same as the letter designating the charging terminal associated with the switching device.

Each switching device 7 is electrically connected to the charging terminal 4 with which it is associated. The switching devices 7 are also interposed one between the other along the electric chain 3.

In addition, switching devices 7 are connected one by one by an electric line of the electric chain 3. Each switching device 7, associated and connected to a charging terminal 4, allows connection to the charger 2a on the one hand or to the charger 2b on the other hand via the electric chain 3.

A switching device 7 is adapted to be able to be switched between several configurations. Depending on the configurations (for the illustrative example of charging terminal 4a):

The switching device 7a allows electrical connection of the charging terminal 4a with which it is associated with the charger 2a, the switching device 7a allows electrical connection of the charging terminal 4a with which it is associated with the charger 2b, The switching device 7a does not connect the charging terminal 4a with which it is associated with any charger and electrically isolates the terminal 4a from the chargers and the other charging terminals.

Moreover, the switching system 6 is configured so that, if a charging terminal 4 is connected to a charger 2, the other charging terminals are not connected to this charger 2.

It follows that, instantaneously, a charger 2 is connected to at most a single charging terminal 4. By "instantaneously", we mean here "at a given moment". A charging terminal 4 is connected at most to a single charger 2. The switching system 6 thus allows a one-to-one association between the chargers 2 and the charging terminals 4. At a given instant, for each charging terminal 4, either it is not connected to any charger, or it is connected to a single charger 2. At a given instant, for each charger 2, either it is not connected to any charging terminal 4, or it is connected to a single charging terminal 4. Consequently, the switching system 6 prohibits several chargers from being connected simultaneously to the same charging terminal 4.

The charging system 1 also includes a control system 8. The control system 8 is for example placed in a box close to one of the chargers 2, 3, or in a remote server (not shown). The control system 8 is external to the vehicles to be charged. The control system 8 is in communication, wired or wireless, with each of the switching devices 7. The control system 8 is configured to repeatedly control the switching devices 7 between their three configurations.

The control system 8 is clocked by a clock, for example according to a predetermined rate. The rate can for example be parameterized, and modified over time. According to an exemplary embodiment, the rate is one operation of verifying a need for switching every 5 minutes. One can for example provide an operation of verifying a need for switching at a frequency between once every ten seconds and once every twenty minutes.

This determination is not necessarily periodic. For example, provision can be made for a new operation of verifying a need for switching to be implemented on connection of a new vehicle or on disconnection of a new vehicle.

When an operation for verifying a need for switching is triggered, the control system 8 verifies the need for switching. Depending on the result of this operation, either the control system 8 does not control any switching, or the control system 8 controls one or more switching of the switching devices 7. Since each switching device 7 has three configurations, "switching" is the switching of a switching device 7 from its current configuration to another configuration. As will be seen below, this switching control may require the switching of several switching devices 7, or even of several individual switches forming part of the switching devices 7.

Figure 2:
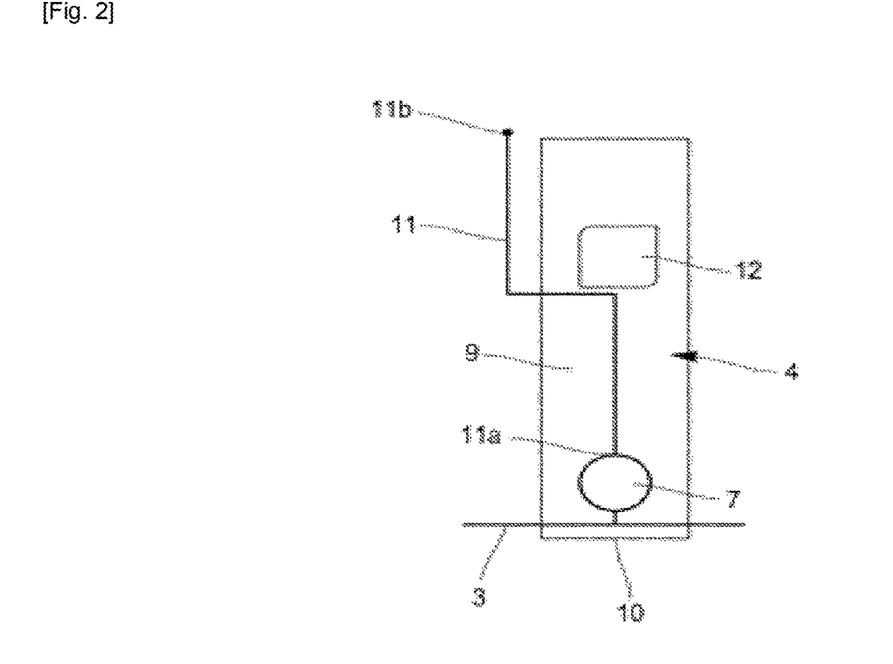
FIG. 2 schematically represents a charging terminal equipping the charging system of FIG. 1.

FIG. 2 schematically represents a charging terminal 4. The charging terminal 4 may comprise a support 9 delimited by a casing 10, and fixed to the ground. The support 9 receives a charging cable 11 comprising a first end 11a and an opposite second end 11b. The first end 11a is electrically connected to the switching device 7. The second end 11b comprises a charging interface adapted to be electrically connected to a complementary charging interface of the electric vehicle.

Although, in the diagram, the switching device 7 is shown as integrated into the charging terminal 4, this is not necessarily the case. The switching device 7 can be adjacent to the charging terminal.

As will be understood from the following description, the charging terminal 4 can comprise various electronic components. These can be electrically powered by an electrical connection from the charging terminal 4 to the mains. This electrical connection can, if necessary, be made via the electric chain 3. In particular, as shown in FIG. 2, the electric chain 3 comprises, upstream of the charging terminal 4, an electrical harness which comprises one or more wires which are electrically connected to the switching device 7, and one or more wires which are electrically connected to the electronic components of the charging terminal 4 (materialized, in the example, by the electronic interface 12 presented below) for the electrical supply of these components.

The charging terminal 4 may also include an electronic interface 12 adapted to allow communication between the motor vehicle associated with the charging terminal 4 and the charging system 1. Several variants are possible for the electronic interface 12. According to one example, provision may be made for the electronic interface 12 to include means for sending information to the user and/or means for receiving information from the user. Depending on the embodiments, it is possible, for example, to provide a screen and keyboard system, or a touch screen, and/or a system communicating with a portable computer device of the user, and/or with a computer device of the vehicle, making it possible to exchange information via the man-machine interface of one and/or the other of these computing devices.

The charging system 1 comprises a communication system adapted to allow the transfer of information between the various components which need it. The electronic interface 12 described above forms part of this communication system. The communication system can also include a communication system between the charging terminal 4 and the control system 8. The control system 8 therefore comprises an information reception module. For example, a wired communication is provided between the charging terminal 4 and the control system 8, to transmit information between the charging terminal 4 and the control system 8. It is possible in particular to use the electric chain 3 for the transmission of this information. This electric chain 3 therefore comprises wires which allow the transfer of information between the charging terminal 4 and the control system 8, for example via the charger 2a. The information in question includes, for example, that entered, or part of that retrieved via the electronic interface 12 of the charging terminal 4. The information in question can also include information coming from the vehicle (for example from the vehicle battery), and transmitted by the vehicle to the charging terminal 4. The information in question can also include an identifier of the charging terminal 4 to be associated with the above-mentioned information.

Alternatively, the communication system may include a communication system between the control system 8 and the user directly. It is for example possible to provide a wireless communication system between the control system 8 and the users portable computer device, and/or with a computer device of the vehicle.

According to one example, the electrical charge demand information communicated to the control system 8 can comprise one and/or the other of the following information, associated with each other:
- an identifier of an electric vehicle;
- a user identifier;
- an identifier of a charging terminal;
- information on the arrival time of an electric vehicle at a charging terminal;
- information on the estimated departure time of an electric vehicle from the charging terminal;
- information on the estimated duration of presence of an electric vehicle at a charging terminal;
- information on the initial charge level of an electric vehicle;
- information on the desired final charge level for an electric vehicle;
- information on the instantaneous charge level for an electric vehicle;
- a set of physical parameters of the battery of the vehicle such as for example the temperature or the electrical voltage at the battery.

The control system 8 can also use one and/or other of the information below:
- information on the availability of the energy source such as the electricity grid;

information relating to one or more electrical charging characteristics of each charger, such as, for example, the direct current charging power.

In addition, the control system 8 has instantaneous time information provided by a clock.

The information in question is either provided by the user, the vehicle, the charging terminal, the charger, the energy source, or, in certain cases, estimated by the control system 8.

The control system 8 comprises a processor adapted to determine, repeatedly, a map of connections between the charging terminals and the chargers, according to the information available. The map of connections is determined by the processor in order to respond optimally to a charging request by electric vehicles. The optimal way is determined by one or more rules stored and accessible to the processor. These rules are, if necessary, configurable. According to an exemplary embodiment, the processor minimizes a difference between the nominal charging power available at the charging system and the charging power consumed, by taking into account, in terms of constraints, the configuration of the charging system, the current map and an estimate of future charge demand.

To determine the map of connections, the processor can for example take into account the current map of connections.

Following the establishment of the map of connections, the control system 8 can control the switching of one or more switching devices 7, to respect the determined map of connections.

In some cases, the determined map of connections is unchanged with respect to the previous map of connections and, in this case, the control system does not control any switching.

Figure 3:
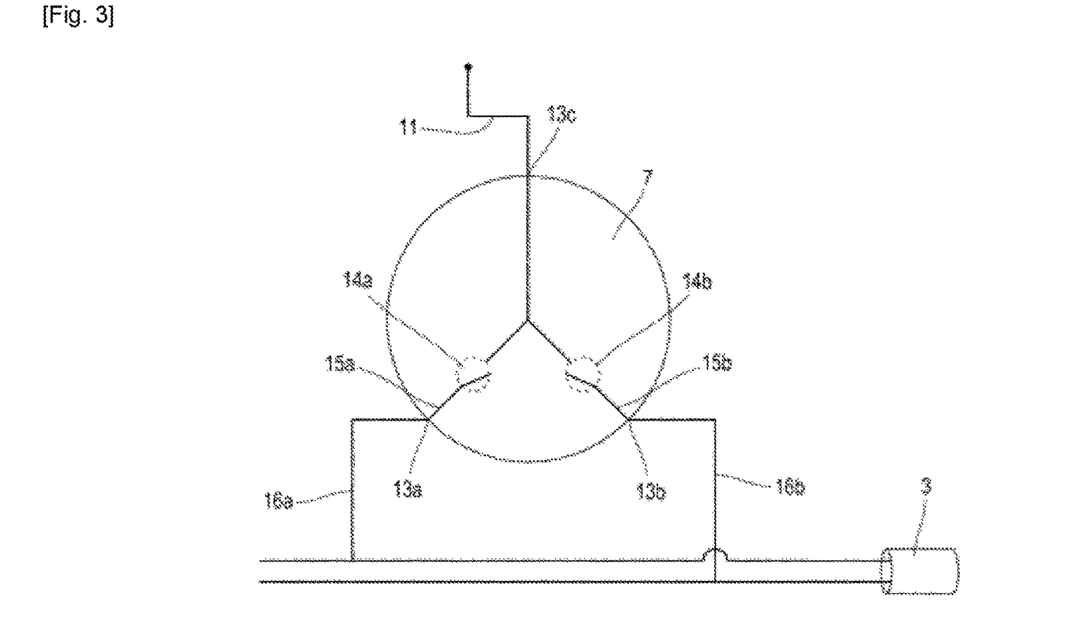
FIG. 3 schematically represents a switching device equipping the charging system of FIG. 1.

FIG. 3 schematically represents a switching device 7 according to one embodiment. The switching device 7 comprises three connection interfaces: A connection interface 13a with the first charger 2a, a connection interface 13b with the second charger 2b, a connection interface 13c with the cable 11.

The switching device 7 comprises electrical wirings making it possible to establish various electrical connections. Electrical wiring can be designated either by the general reference "15", or individually by the reference "15" followed by a letter. The switching device 7 comprises various individual switches. The individual switches can be designated either by the general reference "14", or individually by the reference "14" followed by a letter. Different variants of the arrangement presented are possible to obtain the same switching functions.

An electrical wiring 15a connects the connection interface 13a to the connection interface 13c. A switch 14a equips this electrical wiring. An electrical wiring 15b connects the connection interface 13b to the connection interface 13c. A switch 14b equips this electrical wiring. A security system is configured so that only one of the switches 14a, 14b can be closed at a time.

An electrical line 16a connects the connection interface 13a to the first charger 2a. An electrical line 16b connects the connection interface 13b to the second charger 2b. The electrical lines 16a and 16b are included in the electric chain 3.

Each individual switch 14 can alternately assume the closed state (the current passes) or the open state (the current does not pass).

In the diagram of FIG. 3, the two switches are in the open state. Therefore, in this configuration, the cable 11 is not powered.

The following configurations of the switching device 7 are possible ("F" represents the "closed" state, and "○" represents the "open" state):

TABLES 1

| # | Switch 14a | Switch 14b | Configuration |
|---|---|---|---|
| XX | ○ | ○ | Open, the vehicle is electrically isolated from the system |
| AA | F | ○ | The vehicle is connected to the charger 2a for a faster charge |
| BB | ○ | F | The vehicle is connected to the charger 2b for a slower charge |

The faster "AA" charging configuration of a vehicle by the charger 2a requires that the interface 13c of each of the other charging terminals 4 be electrically disconnected from the interface 13a thereof; and that it is isolated from the charger 2a. Thus, the switching devices 7 of the other charging terminals 4 must be in the "XX" or "BB" configuration.

The slower "BB" charging configuration of a vehicle by the charger 2b requires that the interface 13c of each of the other charging terminals 4 be electrically disconnected from the interface 13b thereof; and that it is isolated from the charger 2b. Thus, the switching devices 7 of the other charging terminals 4 must be in the "XX" or "AA" configuration. Thus, whatever the configuration chosen, each vehicle is associated at most with, and charged at most by, a single charger.

The implementation of an embodiment of the invention will be described below.

It can be assumed that initially no electric vehicle is connected to the charging system 1. Fossil fuel vehicles may be parked in various locations but are not plugged in. If no vehicle is connected, the control system 8 can be deactivated. All of the switching devices 7 can be in their open "XX" configuration.

A first electric vehicle VE1 is parked at a location. To fix ideas, the electric vehicle VE1 parks in location 5c. The user of the electric vehicle VE1 electrically connects the vehicle using cable 11 from terminal 4c.

The control system 8 receives the following information: the identifier of the charging terminal 4c from the latter, information on the time of arrival of the electric vehicle at the charging terminal 4c from a clock, information on the initial charge level of the electric vehicle from the processor of the electrical vehicle. For example, this information is transmitted by a wireless communication system between each charging terminal and the control system 8. Connecting the charging terminal to the electric vehicle triggers the sending of information from the charging terminal 4c to the control system 8. The clock is for example centralized at the level of the control system 8.

The control system 8 can also receive one and/or the other of the following pieces of information from the user: information on the estimated time of departure of the vehicle, or information on the estimated duration of the presence of the vehicle at the charging terminal, and desired final charge level information for the electric vehicle associated with the charging terminal.

As discussed above, this information is provided by the user via the human-machine interface of the charging terminal, a portable processor of the user, and/or a processor of the vehicle. If necessary, failing to receive this information, the control system may use pre-recorded parameters. According to one example, the estimated duration of presence is fixed at a predetermined value, for example two hours (parameterized according to the operation of the system, for example between one hour and ten hours). According to one example, the desired final charge level information for the electric vehicle can for example be set to "full of energy" or to "without setpoint", in which case the control system 8 will charge the vehicle as best as possible according to the other constraints.

At a given moment, the control system 8 establishes the map of connections.

Given that only one vehicle is to be charged, the control system 8 establishes a map of connections by which the vehicle of the location 5c is charged by an available charger. Based on the information, the control system determines whether the vehicle in location 5c is to be charged by means of faster charging or slower charging. In the present case, the control system 8 determines that the vehicle of the location 5c is to be charged by a faster charge, and therefore by the charger 2a.

The control system 8 controls the switching system 6 to electrically connect the charging terminal 4c to the first charger 2a via the electric chain 3.

The map is as follows:

TABLES 2

| 2a | 7a | 7b | 7c | 7d | 7e | 7f | 7g | 7h | 2b |
|---|---|---|---|---|---|---|---|---|---|
| XX | XX | AA | XX | XX | XX | XX | XX | | |

It will be noted that alternatively, if the control system 8 determines that the vehicle of the location 5c is to be charged by a slower charge, the vehicle could be charged by the charger 2b. The map of connections would then be different:

TABLES 3

| 2a | 7a | 7b | 7c | 7d | 7e | 7f | 7g | 7h | 2b |
|---|---|---|---|---|---|---|---|---|---|
| XX | XX | BB | XX | XX | XX | XX | XX | | |

Regularly, the control system 8 establishes a map of connections. As long as the electric vehicle requires faster charging, a priori, there is no need to change the map of connections.

At a given moment, depending on the information, the control system determines that the vehicle in location 5c is to be charged by means of a slower charge, and therefore by charger 2b. This information is for example:
- the battery level,
- information of power reduction from the vehicle to control the temperature of the battery,
- information of power reduction from the energy source,
- the arrival of another priority vehicle requiring faster charging.

In this case, the control system 8 controls the switching system 6 to electrically connect the charging terminal 4c to the second charger 2b via the electric chain 3. Typically, the control system takes into account that a faster charger should not be used to ensure the continuation of the charging of the battery of the electric vehicle. In this case, if you have a slower charger, and if another electric vehicle can benefit from a faster charge, it is more efficient to finalize the charge of the electric vehicle with the "slower" charger.

Whether it is charged by the first charger 2a or the second charger 2b, if the electric vehicle reaches the charging set point, or if the charging service is interrupted, the control system 8 is interrupted.

In some cases, the vehicle VE1 is being charged by the charger 2a when a second electric vehicle VE2 requests access to the service. The service access request for the VE2 vehicle is made in the same way as for the vehicle VE1, as described above.

To fix ideas, in a first embodiment, the second electric vehicle VE2 parks in location 5g.

At a given moment, the control system 8 establishes the map of connections.

Given that only two vehicles are to be charged, the control system 8 establishes a map of connections by which each charger charges a vehicle according to the received information and the established priorities.

If, on arrival, the electric vehicle VE2 does not benefit from a higher priority service, there is no particular reason to reduce the charging power of the first vehicle VE1. The map is then as follows:

TABLES 4

| 2a | 7a | 7b | 7c | 7d | 7e | 7f | 7g | 7h | 2b |
|---|---|---|---|---|---|---|---|---|---|
| XX | XX | AA | XX | XX | XX | BB | XX | | |

Regularly, the control system 8 establishes a map of connections. As long as electric vehicles charge, a priori, the map of connections will not change.

If, at some point, the control system 8 determines that it is more efficient to have the vehicle currently having the fastest charge charged by a slower charger, and the other vehicle charged by a faster one, the control system controls a switching of the switching devices 7 for that. The map is then as follows:

TABLES 5

| 2a | 7a | 7b | 7c | 7d | 7e | 7f | 7g | 7h | 2b |
|---|---|---|---|---|---|---|---|---|---|
| XX | XX | BB | XX | XX | XX | AA | XX | | |

This may be the case in particular if the electric vehicle arranged in location 7c has reached a high level of charge, while there is little time left to charge the vehicle arranged in location 7g.

If one of the electric vehicles reaches its charging setpoint, we return to a configuration where only one electric vehicle is to be charged, namely the one that has not reached its setpoint.

In this case, we find ourselves in the configuration described above with a single vehicle to be charged.

In some cases, a third VE3 electric vehicle will request access to the charging service at the location 5e.

We place ourselves for example in a starting configuration as presented in Table 4 above, where vehicles VE1 and VE2 to be charged are at locations 5c and 5g.

The charging system 1 can only charge two vehicles simultaneously.

At a given moment, the control system 8 establishes the map of connections.

This map of connections is established in such a way as to optimize the provision of the service to all applicants.

This goal can be achieved by determining the least bad instantaneous configuration.

The criteria making it possible to determine the least bad instantaneous configuration are parameterized in the control system 8.

The control system 8 therefore determines which are the two vehicles to be electrically charged during the next time interval. This determination can take into account information on the instantaneous charge level of the electric vehicles requesting the service. This information can be communicated either by the motor vehicle, or estimated by the control system 8 from the initial charge level and the charge level transmitted to this vehicle.

This determination can be carried out for example by searching for a minimum for a cost function determined or parameterized in the control system 8. The cost function aims at optimizing the response to the constraints of all the vehicles.

For example, if the estimated departure time of the vehicle VE1 is close, and that it is far from being charged up to the desired level of charge at departure, that the level of charge desired by the vehicle VE3 is "free", and that the estimated departure times of the vehicles VE2 and VE3 are further away than that of the vehicle VE1, an optimal map of connections can be, for the next time interval, to charge the vehicles VE1 and VE2, and not to charge the vehicle VE3.

In this case, the arrival of the VE3 vehicle does not change the map of connections presented above in the case where there are only two vehicles.

Continuing from the previous example, and assuming vehicle VE3 is parked in location 5*e*, the map of connections can be determined as follows:

TABLES 6

| 2a | 7a | 7b | 7c | 7d | 7e | 7f | 7g | 7h | 2b |
|----|----|----|----|----|----|----|----|----|----|
|    | XX | XX | AA | XX | XX | XX | BB | XX |    |

Alternatively, in this example, the control system may determine that the vehicles to be charged are vehicles VE1 and VE3, respectively at locations 5*c* and 5*e*, and in this case the charging of vehicle VE2 is suspended and the map of connections may be determined as follows:

TABLES 7

| 2a | 7a | 7b | 7c | 7d | 7e | 7f | 7g | 7h | 2b |
|----|----|----|----|----|----|----|----|----|----|
|    | XX | XX | AA | XX | BB | XX | XX | XX |    |

Alternatively, in this example, the control system may determine that the vehicles to be charged are vehicles VE1 and VE3, respectively at locations 5*c* and 5*e*, and that vehicle VE3 has high priority and requires faster charging. In this case, the charge to vehicle VE2 is suspended, and that of the vehicle VE1 switches to the slower charger 2*b* to allow faster charging to the vehicle VE3; the map of connections can be determined as follows:

TABLES 8

| 2a | 7a | 7b | 7c | 7d | 7e | 7f | 7g | 7h | 2b |
|----|----|----|----|----|----|----|----|----|----|
|    | XX | XX | BB | XX | AA | XX | XX | XX |    |

In the event that one of the vehicles interrupted the service, the next stage of determination would be made with the remaining vehicles. We then return to the two-vehicle configuration presented above.

In the case of three vehicles being charged, the control system 8 regularly redefines the loading map according to the information available at that moment. This is because the charging speed may decrease as the vehicle battery charge percentage reaches high levels. It would then be wiser to give priority to the faster charge again to a vehicle with a low level of charge. For example, if two vehicles being charged are close to reaching the required level of charge, it becomes more and more penalizing not to charge the third vehicle at all.

At any time, a fourth vehicle may request access to the service.

The operation, described above, for three vehicles, can be extended to four vehicles.

In the example shown, the number of locations between the two chargers is eight. In this example, up to eight vehicles can simultaneously access the service provided by two chargers.

The total number of locations served by the two chargers depends on the configuration of the system installation.

In theory, there is no limit to the maximum number of locations served by the two chargers. However, for practical reasons, and to maximize the chances of being able to provide efficient service, the number of locations served by two chargers can typically be less than 50, or even 20, or even 10.

A high number of locations is possible in parking areas where the density of electric vehicles is low, and where the time intervals for charging electric vehicles are highly variable depending on the vehicle. Thus, fossil fuel vehicles can park on spaces, which are not reserved for electric vehicles.

For the management of electric vehicle fleets, where the density of electric vehicles is high, and where all the electric vehicles are to be charged at the same time, a reduced number of locations per charger is preferred.

Figure 4:
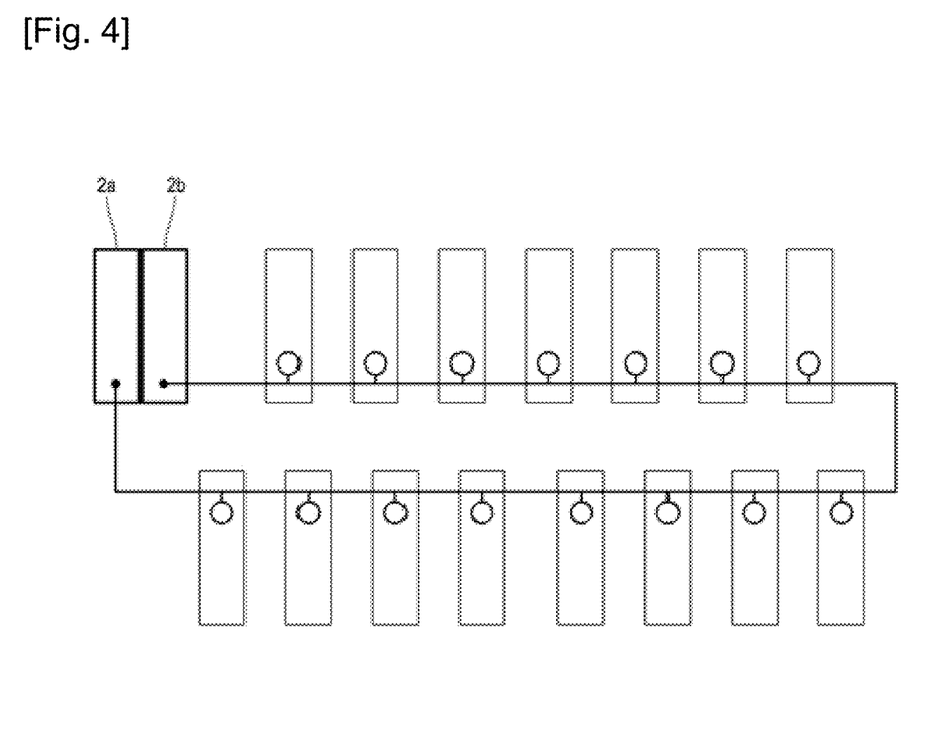
FIG. 4 is a diagram similar to FIG. 1, illustrating another embodiment.

FIG. 4 schematically represents another embodiment of the invention.

This embodiment is in fact similar to that of FIG. 1, except that the two chargers 2*a*, 2*b* are juxtaposed, and that there are more charging terminals arranged on the electric chain 3. In practice, the two chargers could share the same cabinet.

Other configurations can be considered based on the configurations described above. In particular, provision can be made to equip a car park with numerous chargers connected two by two by electric chains, according to a wide variety of configurations.

Alternatively, a charger can be connected to more than two power chains.

Figure 5:
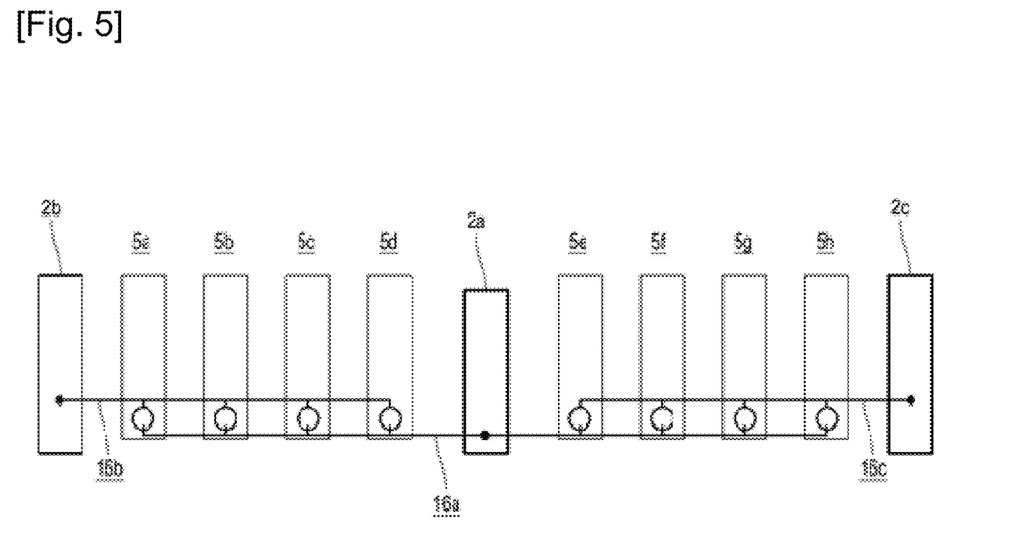
FIG. 5 is a diagram similar to FIG. 1, illustrating another embodiment.

FIG. 5 schematically represents another embodiment. The electric chain 3 comprises a first electric line 16*a* which connects the first charger 2*a* to each of the charging terminals 4. The electric chain 3 also includes a second electrical line 16*b*, which connects the second charger 2*b* to some of the charging terminals 4, and a third electrical line 16*c* which connects the third charger 2*c* to some other charging terminals 4, as is shown in FIG. 5. Each charging terminal 4 is connected at least to the second charger 2*b* or to the second charger 2*c*. The chargers 2*b* and 2*c* are identical chargers, having the same electrical charging characteristic. In particular, the architecture can provide for the number of so-called "faster" chargers to be strictly lower than the number of so-called "slower" chargers, as represented, because it is expected that more vehicles will need, simultaneously, a slower charge rather than a faster charge.

Figure 6:
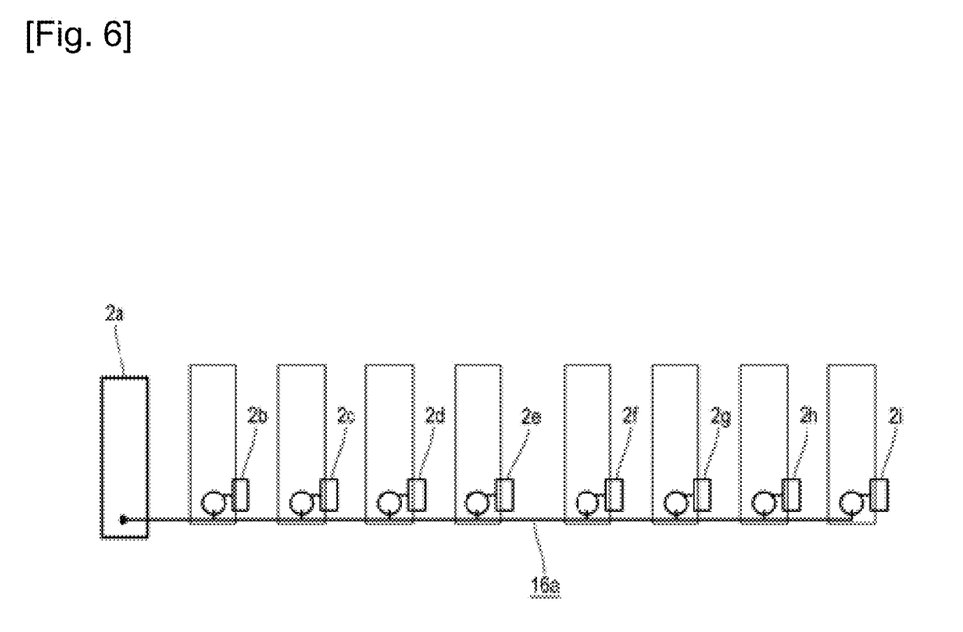
FIG. 6 is a diagram similar to FIG. 1, illustrating an embodiment relating to another invention.

FIG. 6 schematically shows another embodiment of another invention. According to this embodiment, the electric chain comprises a single electrical line 16a. Each charging terminal 4 integrates a local electric charger 2b, 2c, . . . having the second electric charging characteristic. If an electric vehicle, present in a location, is electrically charged, it is either by the local electric charger, or by the first electric charger 2a via the first electrical line 16a.

Thus, according to another aspect, an invention relates to a system for charging electric vehicles with electrical energy comprising:
- at least a first charger and a second charger, each charger being adapted to supply instantaneous electrical energy for charging an electric vehicle, said electrical energies having different electrical charging characteristics,
- a first electric line adapted to connect the first charger to an electric vehicle arranged at any location;
- the second charger is arranged in one location, and each location is provided with a second charger;
- a switching system adapted to alternatively connect or not connect the electric vehicles to the first charger or to the second charger, in which the switching system comprises a switching device associated respectively with each charging location of an electrical device,
- a computerized reception module of a control system adapted to receive electrical charge demand information from electric vehicles,
- a processor of a control system adapted to repeatedly determine a map of connections between the electric vehicles and the chargers, as a function at least of the received charge demand information and of said electrical charging characteristics, the control system being adapted to repeatedly control the switching system to electrically connect one of the electric vehicles to the first charger and another of the electric vehicles to the second charger.

According to one embodiment, provision could be made for at least one of the chargers 2a, 2b, 2c to be mobile. Reference is made, for example, to the mobile chargers described in U.S. Pat. No. 9,592,742 or in international patent application WO 2018/140,886. Such mobile chargers can be used to charge remote electric vehicles, parked in locations not equipped by the invention. Also, if the constraints imposed by the electric vehicles to be charged allow it, and if charging locations 5 are available for a mobile charger to park there, the control system can determine a map of connections that supplies the mobile charger. The mobile charger can then connect electrically to the electric chain via a charging terminal 4.

(empty)

It should be noted that, as a variant or in addition, an electric vehicle can be used as a source of energy. In this case, the chargers are bi-directional.

Each of the chargers 2 is equipped with power electronics equipment: Current converter, power supply components, energy meter, protection equipment (switch, circuit breaker, diode, fuse, etc.), and communication cards with the vehicle to be charged or with the charging terminal.

The description above has been made for a given charging standard, for example the "Chademo" standard. Alternatively, this description can be made for any other charging standard, for example "Combo CCS".

The electric chain 3 comprises several electric lines (of different voltages, making it possible to pass different levels of quantity of electric current) whose number, physical characteristics, lengths and cable sections are determined, according to the embodiments, by the power of the current supplied, the distances between objects, the connection standards for charging vehicles, the communication and the IT necessary for the correct operation of the charging system 1, among other parameters.

If necessary, provision can be made for each charging terminal to be capable of charging the electric vehicle located at this location according to several distinct charging standards. In this case, it is enough to equip the chargers and the electric chains for each standard.

An additional piece of information available to the control system 8, and used for restoring the map of connections, is the vehicle load standard.

REFERENCES

Charging system 1
Chargers 2, 2a, 2b, 2c
Electric chain 3
Charging terminal 4
Charging location 5
Switching system 6
Switching device 7
Control system 8
Support 9
Casing 10
Cable 11
Electronic interface 12
Connection interface 13a, 13b, 13c
Switch 14
Electrical wiring 15
First electrical line 16a
Second electrical line 16b
Third electrical line 16c

The invention claimed is:

1. An electrical energy charging system for electric vehicles, wherein the charging system comprises:
- at least a first charger and a second charger, each charger being adapted to supply instantaneous electrical energy for charging an electric vehicle, said electrical energies having different electrical charging characteristics, wherein said electrical charging characteristics is the set of admissible operating points in terms of electrical voltage and electrical current which can be produced by the respective charger,
- a first electrical line adapted to connect the first charger to an electric vehicle located at any location;
- a second electrical line adapted to connect the second charger to an electric vehicle located at any location,
- a switching system adapted to alternatively connect or not connect the electric vehicles to the first charger or to the second charger, wherein the switching system comprises a switching device respectively associated with a charging cable for each location for charging an electrical device, each switching device being able to alternatively:
- electrically connect the charging cable for the location associated with the switching device to the first charger,
- electrically connect the charging cable for the location associated with the switching device to the second charger, and
- electrically disconnect the charging cable for the location from any charger and from any other charging cable for any other location, the switching system being adapted to prohibit several chargers from being connected simultaneously to the same charging terminal, the switching system being adapted to prohibit any charger from being connected simultaneously to a plurality of charging terminals;

a computerized reception module of a control system adapted to receive electrical charge demand information from the electric vehicles, and a processor of a control system adapted to repeatedly determine a map of connections between the electric vehicles and the chargers, as a function at least of the received electrical charge demand information and of the said electrical charging characteristics, the control system being adapted to repeatedly control the switching system to electrically connect one of the electric vehicles to the first charger and another of the electric vehicles to the second charger.

2. The charging system according to claim 1, wherein the processor is adapted to determine the map of connections from one and/or more electrical charge demand information chosen from:
information on the arrival time of an electric vehicle at the charging system;
information on the estimated departure time of an electric vehicle from the charging system;
information on the estimated duration of presence of an electric vehicle in the charging system;
information on the initial charge level of an electric vehicle;
information on the desired final charge level for an electric vehicle;
information on the instantaneous charge level of an electric vehicle; and
a set of physical parameters of the state of an electric vehicle such as the temperature of the battery, its electrical voltage.

3. The charging system according to claim 1, in which the processor is adapted to determine the map of connections also from information chosen from:
instantaneous time information provided by a clock; and
information on the availability of the energy source such as the electrical grid.

4. The charging system according to claim 1, in which the processor is adapted to determine the map of connections by minimizing a difference between the nominal charging power available at the charging system and the charging power consumed, taking into account, in terms of constraints, the configuration of the charging system, the current map of connections and an estimate of the future charging demand.

5. The charging system according to claim 1, in which the switching system is configured so that each charger is connected, at any given instant, to at most one charging terminal.

6. The charging system according to claim 1, in which the control system is external to any vehicle to be charged.

7. The charging system according to claim 1, in which at least one of the chargers is movable, the control system being adapted to repeatedly control the switching system to electrically connect one of the electric devices to the first charger and another of the electric devices to the second charger depending on the location of the chargers.

8. The charging system according to claim 7, wherein the mobile charger connects to an electrical line at a location.

9. The charging system according to claim 7, in which the mobile charger is an electric vehicle.

10. A method for charging electrical devices with electrical energy wherein, having:
at least a first charger and a second charger, each charger being adapted to supply instantaneous electrical energy for charging an electric vehicle, said electrical energies having different electrical charging characteristics, wherein said electrical charging characteristics is the set of admissible operating points in terms of electrical voltage and electrical current which can be produced by the respective charger, a first electrical line adapted to connect the first charger to an electric vehicle located at any location;

a second electrical line adapted to connect the second charger to an electric vehicle located at any location, a switching system adapted to alternatively connect or not connect the electric vehicles to the first charger or to the second charger, the switching system comprising a switching device respectively associated with a charging cable for each location for charging an electrical device, each switching device being able to alternatively:

electrically connect the charging cable for the location associated with the switching device to the first charger, electrically connect the charging cable for the location associated with the switching device to the second charger, electrically disconnect the charging cable for the location from any charger and from any other charging cable for any other location, the switching system being adapted to prohibit several chargers from being connected simultaneously to the same charging terminal, the switching system being adapted to prohibit any charger from being connected simultaneously to a plurality of charging terminals;

a computerized reception module of a control system receives electrical charge demand information from electric vehicles;

a processor of the control system repeatedly determines a map of connections between the electric vehicles and the chargers as a function at least of the received electrical charge demand information and of the said electric charging characteristics, and the control system (8) repeatedly controls the switching system to electrically connect one of the electric vehicles to the first charger and another of the electric devices to the second charger.

11. A computer program comprising instructions which, when the program is executed by a computer, cause the latter to implement the method according to claim 10.

12. A system for charging electric vehicles with electrical energy, wherein the system comprises:
at least a first charger and a second charger, each charger being adapted to supply instantaneous electrical energy for charging an electric vehicle, said electrical energies having different electrical charging characteristics, wherein said electrical charging characteristics is the set of admissible operating points in terms of electrical voltage and electrical current which can be produced by the respective charger, a first electric line adapted to connect the first charger to an electric vehicle arranged at any location;

each location being associated with a respective second charger;

a switching system adapted to alternatively connect or not connect the electric vehicles to the first charger or to the second charger, in which the switching system comprises a switching device associated respectively with each charging location of an electrical device, a computerized reception module of a control system adapted to receive electrical charge demand information from electric vehicles, and a processor of a control system adapted to repeatedly determine a map of connections between the electric vehicles and the chargers, as a function at least of the received charge demand information and of said electrical charging characteristics, the control system being adapted to repeatedly control the switching system to electrically connect one of the electric vehicles to the first charger and another of the electric vehicles to the second charger.

\* \* \* \* \*